United States Patent [19]
Ito

[11] Patent Number: 5,209,632
[45] Date of Patent: May 11, 1993

[54] HYDROELECTRIC POWER GENERATION EQUIPMENT

[75] Inventor: Takashi Ito, Hitachi, Japan

[73] Assignee: Hitachi, Ltd., Tokyo, Japan

[21] Appl. No.: 765,237

[22] Filed: Sep. 25, 1991

[30] Foreign Application Priority Data

Sep. 25, 1990 [JP] Japan .................................. 2-251967

[51] Int. Cl.$^5$ .............................................. F03B 03/06
[52] U.S. Cl. ...................................... 415/129; 415/33; 415/130; 415/901; 464/180; 464/182
[58] Field of Search ................ 415/1, 170.1, 129, 130, 415/131, 132, 124.2, 216.1, 901, 902, 903; 464/901, 180, 182

[56] References Cited

U.S. PATENT DOCUMENTS

3,447,783  6/1969  Wijkander ............................ 415/129

FOREIGN PATENT DOCUMENTS

0890214  1/1972  Canada .................................. 415/129
1397618  9/1972  United Kingdom ................... 415/33

*Primary Examiner*—John T. Kwon
*Assistant Examiner*—Mark Sgantzos
*Attorney, Agent, or Firm*—Antonelli, Terry Stout & Kraus

[57] ABSTRACT

A hydroelectric power generator equipment includes a hydraulic turbine which has a runner with blades adjustable of opening thereof and a hollow turbine shaft mounting thereon the runner, a power generator having a hollow shaft connected to the turbine shaft, a hydraulic cylinder mounted on the runner to drive the blades, and first and second liquid passages each passing through the turbine and generator shafts and feeding oil to the hydraulic cylinder to adjust the opening of the runner blades. One of members defining the first and second liquid passages is screwed in the inner wall of the shafts around an axially middle portion of the first and second liquid passages to suppress radial movement of the passage defining member. Some of the members are slidably or firmly inserted in other members so that disassembly is easy.

9 Claims, 6 Drawing Sheets

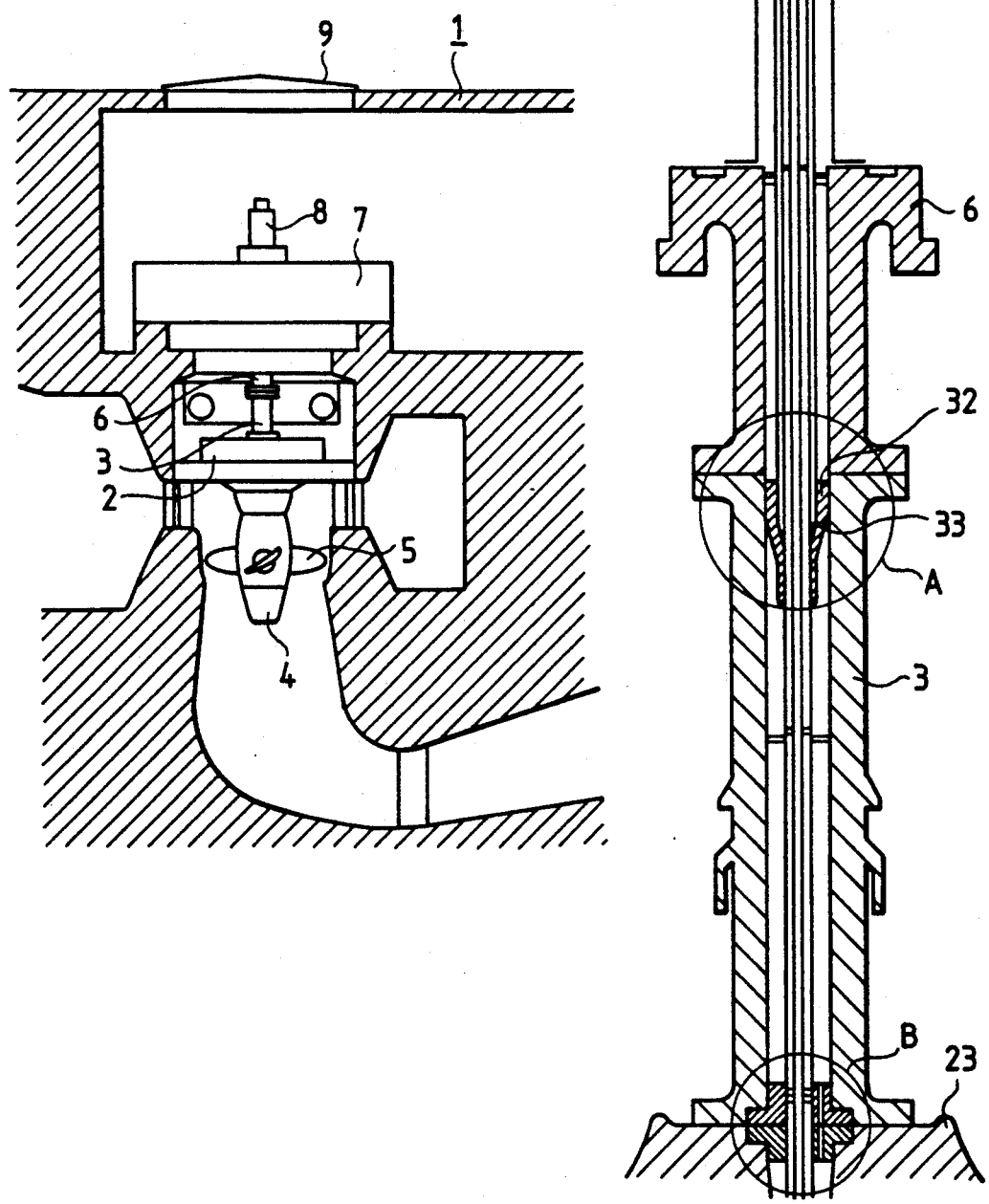

HYDROELECTRIC POWER GENERATION EQUIPMENT

BACKGROUND OF THE INVENTION

This invention relates to a hydroelectric power generation equipment comprising a hydraulic turbine and an electric power generator. The electric power generator is driven by the turbine to produce electric power and, more particularly to drive a runner blade drive apparatus of a movable blade water turbine for middle or low head such as a Kaplan turbine, a tubular water turbine, etc. in the hydroelectric power plant.

A movable blade water turbine is provided with a runner blade drive apparatus for optimum adjustment of a blade opening according to water head, and water flow rate at the turbine. A conventional runner blade drive apparatus will be explained utilizing a Kaplan turbine for instance. The Kaplan turbine is connected to an electric power generator so that a turbine shaft is aligned with a generator shaft, whereby the generator is rotated by the turbine to generate electric power. The conventional runner blade drive apparatus comprises two elongated pressurized oil passages and pass through a hole formed in each of the turbine shaft and the generator shaft, and a double action hydraulic cylinder disposed in the runner for actuating the blades through links connecting therebetween, with the pressurized oil being supplied to the cylinder through the passages. The pressurized oil passages are long (some conduits have total length of 20 m), so that conduits defining the passages each are divided axially into 4 or 5 parts and connected by bolts at flange portions thereof to be one conduit. The conduits are arranged coaxially in the holes of the turbine shaft and the generator shaft so that gaps are provided between an outer one of the conduits and the inner walls of the holes of the shafts even between the flange portions of the outer conduit and the inner walls. Each of the lower ends of the conduits are connected to runner-related parts by means of bolt and nut.

Further, the apparatus has a pipe for detecting a runner blade opening. The pipe is inserted in an inner one of the conduits, divided axially into 4 or 5 parts and connected by bolts means at flange portions to comprise one elongated pipe, the opening detection pipe is connected to a runner-related part at a lower end thereof.

The conduits and the opening detection pipe are rotated together with the turbine shaft and the generator shaft at the same angular velocity when the turbine is rotated.

Shaft vibrations can occur in the conduits and the pipe during their rotation. When the shaft vibrations occur, and the outer conduit contacts the inner wall of the hole of the turbine shaft or the generator shaft noise or damage which results due to impinging of the conduit on the inner wall increases, unless the small gap is not sufficiently large.

Further, the lower ends of the conduits and the opening detection pipe are connected to the runner related parts by means of bolt and nut, as mentioned above, when it is necessary to disassemble the turbine and generator to repair it when the conduits or the opening detection pipe have been damaged. Labor and cost required for the repair of the conduits are large.

SUMMARY OF THE INVENTION

An object of the invention is to provide a hydroelectric power generation equipment having a construction so that shaft vibrations are unlikely to occur.

Another object of the invention is to provide a hydraulic power generation equipment having an apparatus for adjusting a runner blade opening, in which the apparatus includes liquid supply conduits passing through holes formed in a turbine shaft and a generator shaft and supplying pressurized liquid to a hydraulic drive device for actuating the runner blades, and the liquid supply conduits having a construction that shaft vibrations are unlikely to occur and able to be removed without disassembling the turbine and the generator when one or more of the conduits are necessary to be repaired.

The present invention relates to a hydroelectric power generation equipment which comprises a hydraulic turbine having a runner with a plurality of blades the opening of each of which is adjustable and a hollow turbine shaft connected to the runner, an electric power generator having a hollow shaft aligned with and joined to the turbine shaft, drive means disposed in the runner for driving the blades to adjust the blade opening, feed means for feeding pressurized liquid such as oil to the drive means, passage means, disposed so as to pass through the turbine shaft and the generator shaft, for defining liquid passages through which the pressurized liquid is transmitted from and to the feed means to and from the drive means; the passage means being supported by the feed means and the present invention further including the runner, and means for restricting a radial movement of the passage means, the means being disposed in a hollow shaft assembly formed by connection of the turbine shaft and the generator shaft at a portion between both ends of the shaft assembly, preferably at a middle of the axial length of the passage means between the feed means and the runner.

An example of the passage means comprises liquid introduction tubes. One of the liquid introduction tubes is a cylindrical member and has a threaded portion screwed in a threaded portion formed in the inner wall of the shaft assembly at the middle portion of the liquid introduction tubes.

Large magnitude shaft vibration of the liquid introduction tubes including a runner blade opening detection rod (the liquid introduction tubes extend axially from feed means to the runner and here they are called simply as oil conduits) is caused by resonance. The resonance phenomenon occurs when frequency of vibration of the oil conduits which is caused by rotation of the hydraulic turbine coincides with the resonance frequency.

Therefore, in order to avoid the resonance phenomenon, the natural frequency of the oil conduits is separated from vibration frequency caused when the hydraulic turbine rotates. The shaft vibration in this case is lateral vibration of the oil conduits. The natural frequency ($fn$) of the oil conduits, in case lateral vibrations take place in the oil conduits, can be obtained from the following equation:

$$fn = \frac{\lambda^2}{2\pi l^2} \sqrt{\frac{gEI}{\omega}} \quad (1)$$

wherein f: natural frequency of a shaft (1/sec),

λ: constant determined by a fashion that ends of the shaft are fixed,

π: ratio of the circumference of a circle to its diameter l: length of the shaft (cm)

E: elastic modulus of material of the shaft (kg/cm$^2$)

g: acceleration of gravity (980 cm/sec$^2$)

I: geometrical moment of inertia (cm$^2$)

ω: weight per unit length (kg/cm).

On the other hand, frequency (f) of vibration when the turbine rotates is given as follows:

$$F = \frac{N}{60} \quad (2)$$

wherein

N: revolution number of the turbine (rpm).

In general, revolution number (r.p.m.) of the movable blade hydraulic turbine is 100 to 300 r.p.m. and vibration frequency (f) 2 to 5 (1/sec). Further, under an abnormal condition that the turbine reaches a runaway speed, speed increase is three times as much as speed at normal operation, and the vibration frequency (f) becomes 6 to 15 (1/sec).

In general, a method is employed wherein resonance is avoided by making the natural vibration frequency (fn) of the oil conduits higher than vibration frequency (f) caused when the turbine rotates. In order to make the natural vibration frequency (fn) larger, various methods can be taken as apparent from the equation (1). In the present invention, the following method is taken.

In a conventional construction, the oil conduit is fixed to runner-related parts of the hydraulic turbine at a lowest end of the shaft, while in the present invention, the oil conduit is restricted to move radially at the intermediate portion preferably at the middle portion and the lower end of the oil conduit. In the above case, the oil conduit is supported by the turbine shaft or the generator shaft at the middle portion and the lower end of the oil conduit, the axial length of the oil conduit between the fixing points is ½ times as long as an axial distance between the fixed points in the conventional construction. Therefore, in the present invention natural vibration frequency can be raised by 4 times as high as natural vibration frequency of the conventional construction. The oil conduit long shaft, that, is the liquid passage defining members including the runner blade opening detection rod is removed from the danger of the resonance phenomenon.

According to an aspect of the invention, the liquid passage defining members includes a plurality of tubes and one of the tubes is screwed in a threaded portion of an inner wall of a part of the the shaft assembly of shafts, whereby the oil conduit long shaft is supported at the middle portion thereof.

According to another aspect of the invention, a tube end or tube ends of the liquid passage members are mounted on the generator shaft and/or the turbine shaft by a slide fit or a tight insertion, so that the tube can be pulled out of the turbine and generator shafts without disassembling the generator and the turbine.

BRIEF DESCRIPTION OF THE INVENTION

FIG. 1 is a sectional view of a hydroelectric power plant,

FIG. 2 is a sectional view of a generator shaft, a turbine shaft connected thereto and liquid passage defining members according to the present invention;

DETAILED DESCRIPTION OF THE INVENTION

Figure 3:
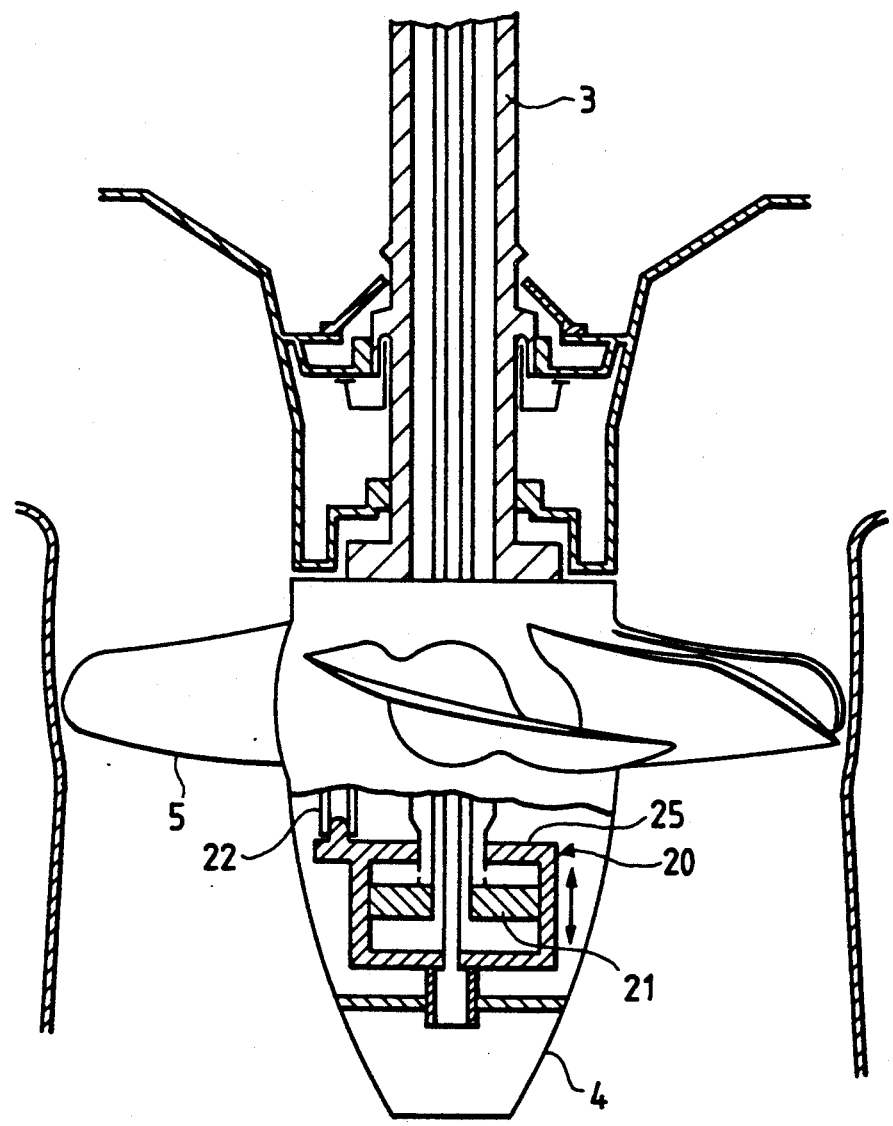
FIG. 3 is a sectional view of a runner.

An illustration of a hydroelectric power generation equipment in a hydroelectric power plant 1 will be described referring to FIG. 1.

The hydroelectric power generation equipment includes a movable blade turbine 2 having a runner 4 provided with a plurality of blades 5 and a turbine shaft 3 connected to the runner 4 and projecting upward, an electric power generator 7 having a generator shaft 6 connected to the turbine shaft 3, and a pressurized oil feed device 8. The power plant 1 has a dismountable lid 9 disposed over the generator 7.

A Kaplan turbine or a tubular turbine are both a typical example of the movable blade turbine 2.

The opening of each blades 5 is adjusted according to a water flow rate, head, etc..

Apparatus for operating the blades to adjust the opening thereof comprises a runner blade drive device disposed in the runner 4 as illustrated in FIG. 3; the pressurized oil feed device 8 for supplying pressurized oil into the drive device and passage means 12 for introducing the pressurized oil from the feed device 2 into the drive device is illustrated in FIG. 2.

Referring to FIG. 2, the passage means 12 passes through holes formed in the turbine shaft 3 and in the generator shaft 6. The passage means 12 includes first and second passages 14 and 13 which are coaxially arranged. Each of the passages 14, 13 is divided axially into several parts, for example, 5 parts.

Figure 4:
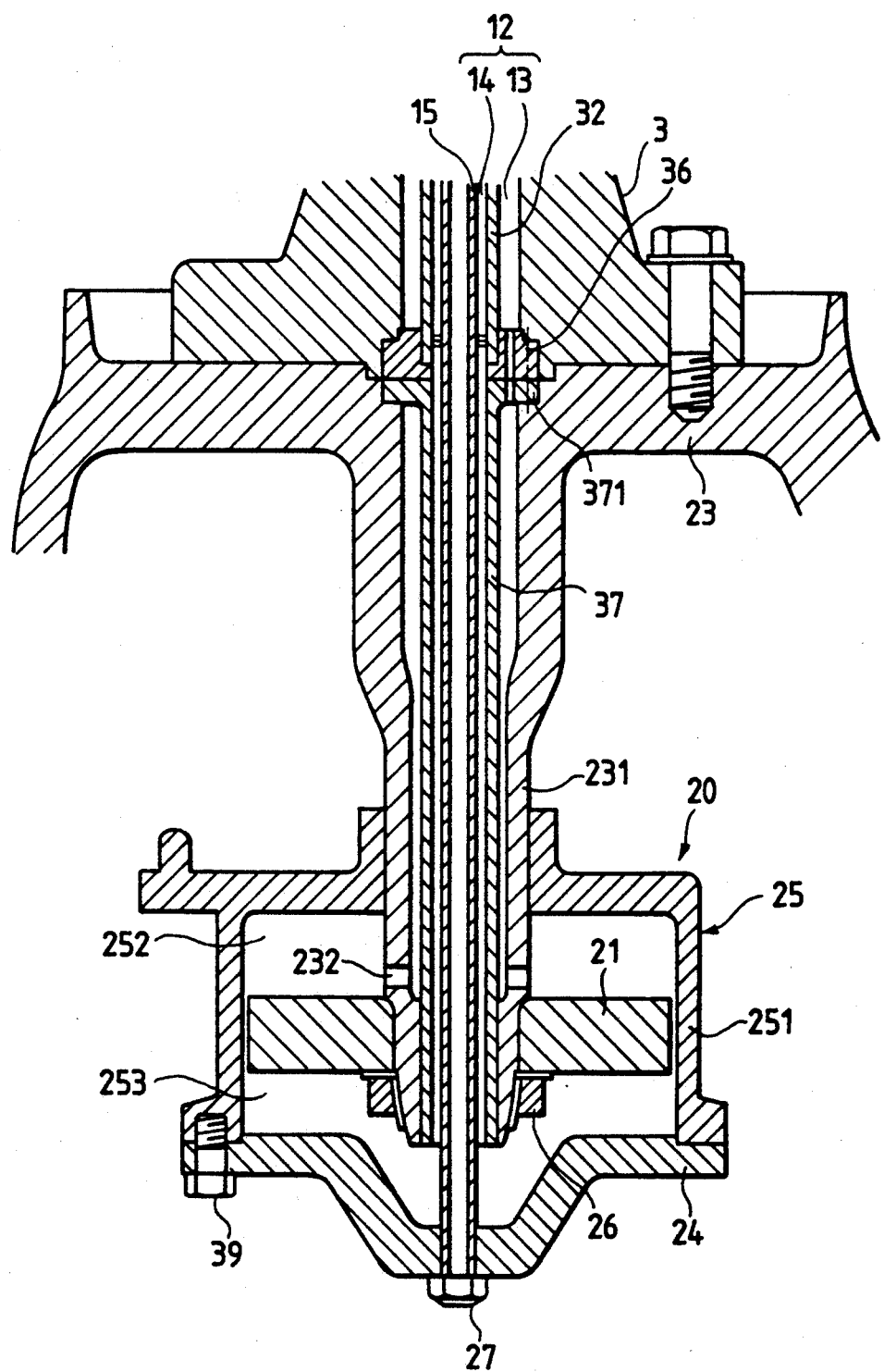
FIG. 4 is an enlarged sectional view of a part of the runner.
Figure 5:
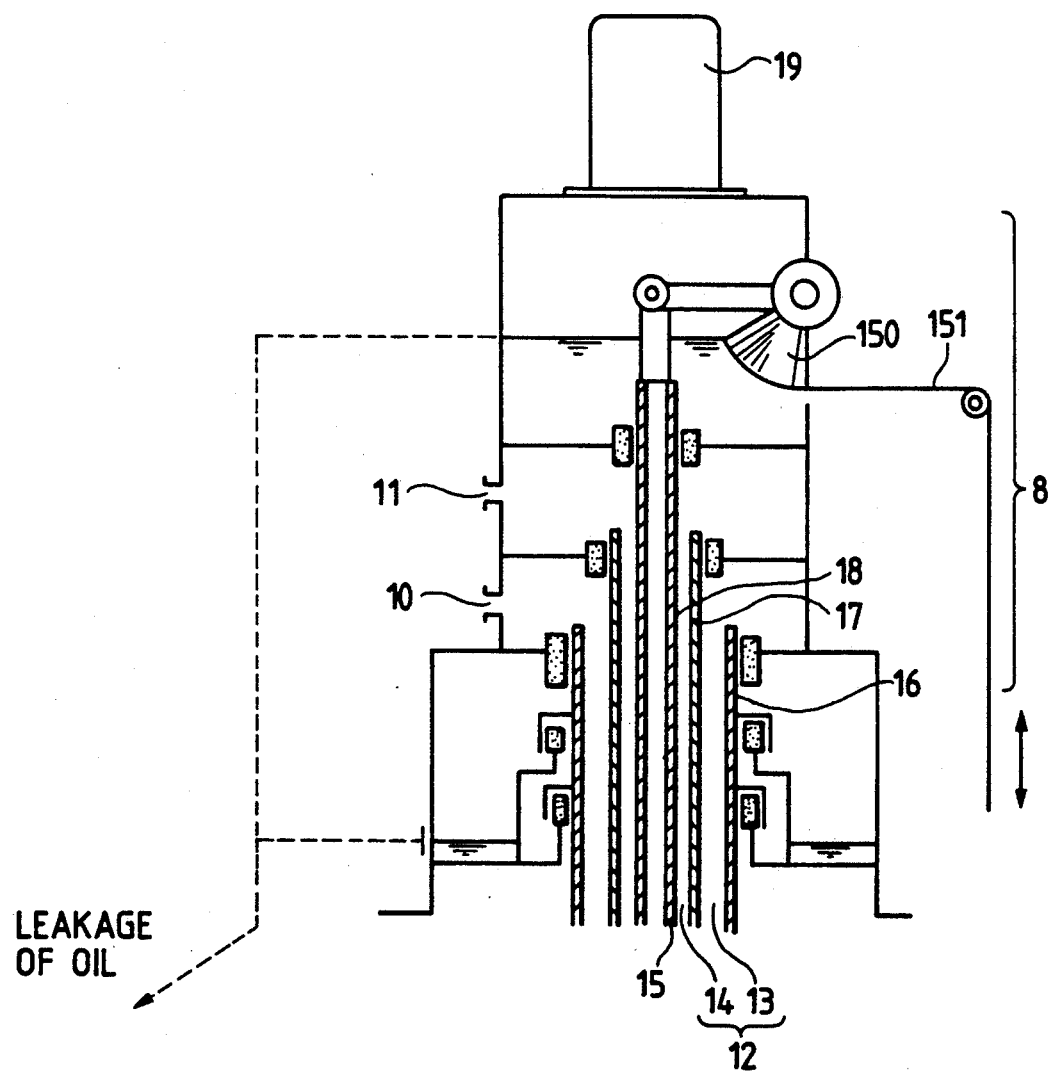
FIG. 5 is a schematic diagram showing a liquid feed device.

The pressurized oil feed device 8 and lower parts of the passage means are explained referring to FIGS. 3 to 5.

Referring to FIG. 3, the runner blade drive device 20 is disposed in the runner 4 and comprises a double action type hydraulic cylinder 25 including therein a piston 21 and links 22. The cylinder 25 is moved hydraulically and actuates links 22 connected to the blades 5 to drive the blades 5. In FIG. 4, a more detailed structure illustrates of the drive device 20.

The hydraulic cylinder 25 has a cylinder block 251 slidably mounted on a projection 231 of a runner boss 23 projecting downward from a runner boss flange portion of the runner 4, a cylinder cover 24 secured to the cylinder block 251 by bolts 39, and the piston 21 secured to the projection 231 of the runner boss 23 by a screw nut 26. The cylinder cover 24 is secured to a runner blade opening detection rod or tube 15 by a nut 27. Oil fills both an upper cylinder chamber 252 at an upper side of the piston 21 and a lower cylinder chamber 253 at a lower side of the piston 21.

Referring to FIG. 5, the pressurized feed device 8 has an pressurized oil inlet port 11 for opening the blades 5 and a pressurized oil inlet port 10 for closing the blades 5. The inlet ports 10 and 11 communicate with the second and first liquid passages 13, 14, respectively. When the pressurized oil is supplied to the first liquid passage 14 as the oil is easily discharged from the inlet port 10, the cylinder block 251 is moved downward to move the blades 5 to open or increase the opening thereof.

In contrast, when the pressurized oil is supplied to the second liquid passage 13 through the inlet port 10 with the oil being discharged from the inlet port 11, the cylinder block 251 is raised to move the blades to close or decrease the opening degree thereof.

Movement of the cylinder block 251 is detected by the movement of the opening detection rod 15. The movement of the detection rod 15 is transmitted to a governor (not shown) through a lever 150 and a wire 151, and used for control of the hydraulic turbine.

Figure 6:
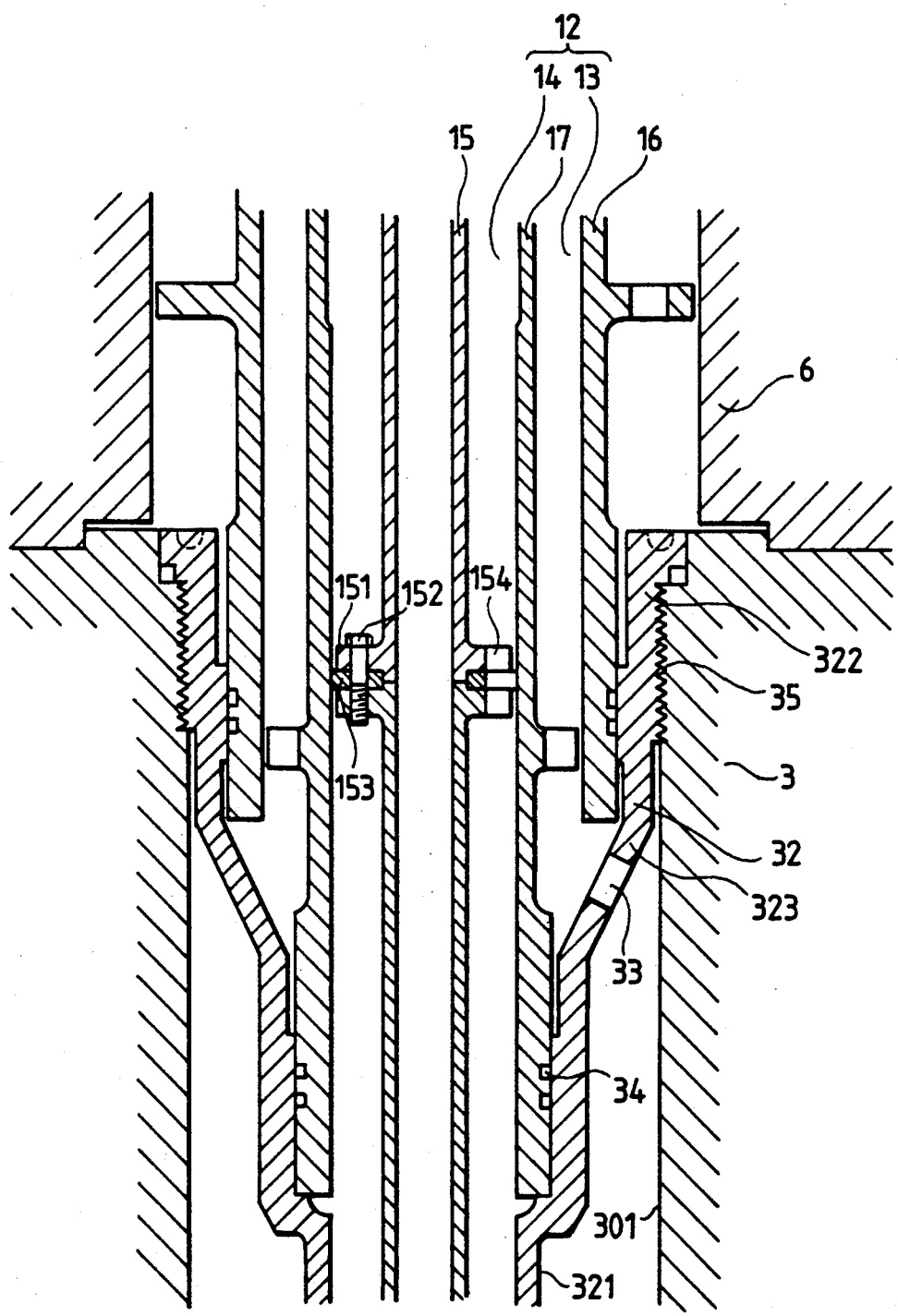
FIG. 6 is an enlarged sectional view of a part of FIG. 2 encircled and indicated by A.

Next, liquid passage defining means will be described referring to the drawings in detail hereunder. In FIGS. 6 and 4, first liquid passage 14 is defined by a plurality of members, that is, an inner tubular member or tube 17, a cylindrical member or the tube 32 and a tubular partition member 37 having a flange portion 371. When the opening detection rod 15 is employed, the rod 15 also defines an inner side of the first liquid passage 14. The second liquid passage 13 is defined by an outer tubular member 16, an inner wall 301 of the turbine shaft 3, the runner boss projection 231, the inner tubular member 17, the cylindrical member 32, and the tubular partition member 37.

Referring to FIG. 6, the cylindrical member 32 has an elongated portion 321 axially extending, an end portion 322 which has a larger diameter than the elongated portion 321, and a transitional portion 323 between the elongated portion 321 and the end portion 322. The transitional portion has holes 33 formed therein to allow the pressurized oil to flow therethrough.

The end portion 322 is threaded at the outside thereof and is screwed in a threaded portion 35 of the turbine shaft 3 around an upper end portion thereof. The outer tubular member 16 is sealingly fitted in the end portion thereby to be suppressed to move radially relative to the turbine shaft 3. The inner tubular member 17 also is sealingly fitted in an upper end of the elongated portion 321, whereby an upper part of the second liquid passage 13 is formed. A lower part of the second liquid passage 13 is defined by the inner wall 301 of the turbine shaft 3 and the elongated portion 321 of the cylindrical member 32, and the lower part of the second liquid passage 13 fluidly communicates with the upper part through the holes 33 of the transitional portion 323. A numeral 34 indicates sealing means.

Figure 7:
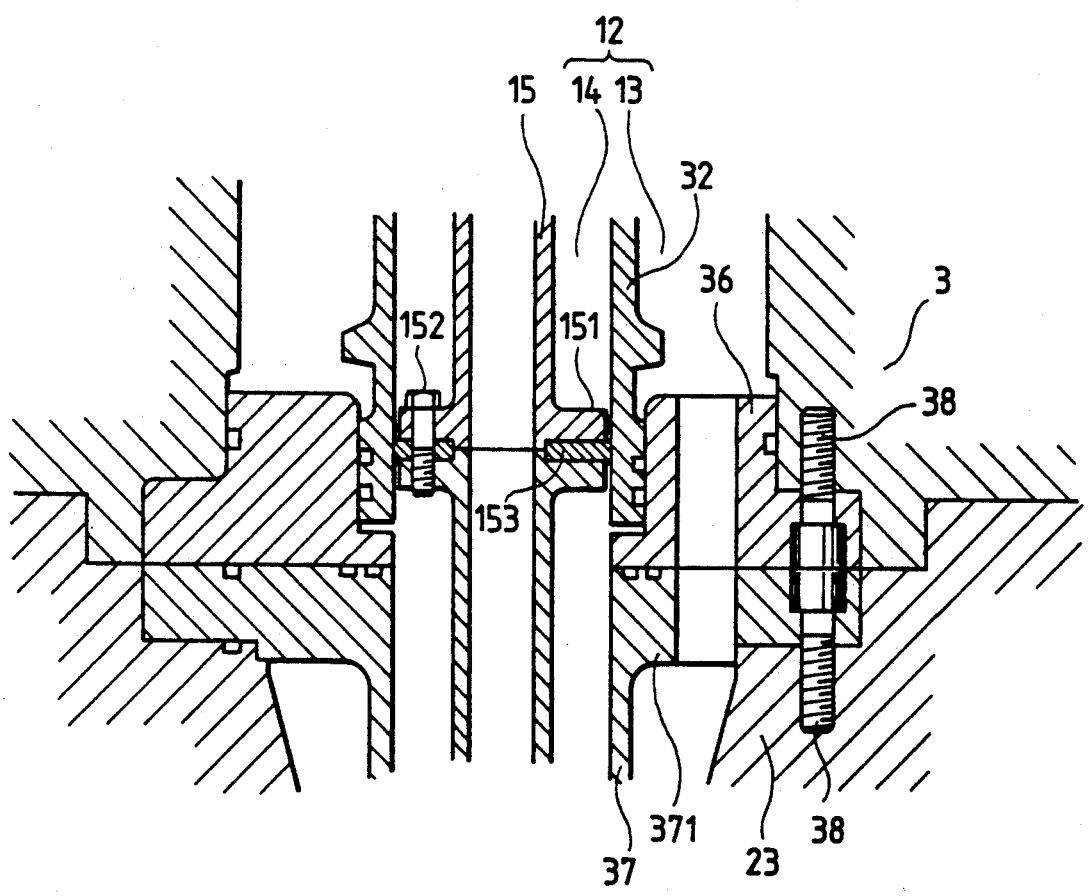
FIG. 7 is an enlarged sectional view of another part of FIG. 2 encircled and indicated by B.

The turbine shaft 3 has an annular coupling 36 sealingly by fitted in a lower end thereof and secured thereto by bolts 38 as shown in FIG. 7. The cylindrical member 32 is sealingly fitted in the coupling at a lower end thereof. Thus, the cylindrical member 32 is fixed to the turbine shaft 3.

The turbine shaft 3 has the runner 4 secured thereto at the lower end. The runner boss 23 is hollow at the projection 231. The tubular partition member 37 is secured to the runner boss 23 at its flange 371 by bolts 38. The tubular partition member 37 and the projection 231 forms a lowest part of the second liquid passage 13. This part communicates with the upper part of the second liquid passage 13 through holes formed in the flange of the tubular partition member 37 and the holes of the coupling 36. At the lower portion of the projection 231, holes 232 are formed. The pressurized oil is introduced into or discharged from the upper cylinder chamber 252 through the holes 232.

The lower end of the first liquid passage 14 is opened to the lower cylinder chamber 253, whereby the pressurized oil can pass therethrough.

The opening detection rod 15 is secured to the cylinder cover 24 and extends upwards therefrom, so that the first liquid passage 14 is defined by the rod 15 as mentioned above. The rod 15 also is axially divided into several parts and the divided parts are connected by flanges as illustrated in FIG. 6. Namely, the divided parts each have a flange 151 formed at an end, and opposite flanges 151 sandwich a slide guide 153 and secure the slide guide 153 by bolts 152. The slide guide 153 and the flanges 151 have a plurality of holes 154 to allow pressurized oil to pass through.

In a conventional apparatus for operating runner blades, it was impossible to disassemble and repair oil introduction conduits independently. The apparatus according to the invention is able to do so. When it is required to disassemble and repair the tubular partition member 37. The tubular partition member 37 can be disassembled from the runner boss 23 after disassembling the runner boss 23 from the turbine shaft 3. The tubular partition member 37 can be separated from the above liquid passage defining members, so that the partition member 37 can be separated independently from the above liquid passage defining members. In the conventional apparatus, one of the oil introduction conduits was secured to the runner boss 23 at an intermediate portion inside the runner boss 23, so that the runner boss could not be separated even if the connection between the runner boss 23 and the turbine shaft 3 is disconnected because one of the oil introduction conduits is fixed to the inside of the runner boss 23.

The inner and outer tubular members 17 and 16 are sealingly inserted in the cylindrical member 32, so that the members 17 and 16 can be pulled out therefrom and can be out of the turbine and generator shafts 3 and 6. The cylindrical member 32 can be pulled out by disengaging the screw part 35 from the screw part 35 of the inner wall of the turbine shaft 3. Further, the opening detection rod 15 can be pulled upwards by disconnecting the nut 27.

In a manner as mentioned above, the liquid passage defining members can be easily disassembled.

As mentioned above, the liquid passage defining members including the runner blade opening detection rod 15, that is, the oil conduits, is screwed in the inner wall of the turbine shaft 3 at the middle of the axial length thereof. The upper portions of the liquid passage defining members, that is, the inner and outer tubular members 17, 16 and the rod 15 are supported at three points which are a casing 81 of feed device 8, an upper end of the runner boss 23 and the threaded portion 35 (including the slide guide 153), as shown in FIG. 2, so that the natural vibration frequency is raised 4 times of one of the conventional apparatus, whereby the resonance phenomenon can be avoided sufficiently. Instead of the screw connection between the turbine shaft inner wall and the cylindrical member, press fit connection can be employed there.

What is claimed is:

1. A hydroelectric power generation equipment comprising:
   a hydraulic turbine including a runner with a plurality of blades each having an adjustable opening, and an axially extending hollow turbine shaft connected to said runner;

an electric power generator having a hollow shaft aligned with and connected to said hollow turbine shaft to transmit a rotation of said runner to said electric power generator, said hollow turbine shaft and said hollow shaft of the electric power generator connected thereto forming a shaft assembly;

drive means, disposed in said runner, for driving said blades to adjust the opening of the blades;

feed means for feeding pressurized liquid;

passage means for defining a liquid passage through which the pressurized liquid is transferred between said feed means and said drive means, said passage means being disposed so as to pass through said shaft assembly and supported by said feed means and said runner; said passage means comprising a first passage means for defining a first liquid passage and a second passage means for defining a second liquid passage, said first passage means including a cylindrical member fitted in said shaft assembly at both ends thereof and an inner tubular member disposed axially to said cylindrical member, said inner tubular member being connected to said cylindrical member so that an inner surface of said inner tubular member aligns with an inner surface of said cylindrical member, thereby forming said first liquid passage, said second passage means comprising said cylindrical member, said inner tubular member being connected thereto, an outer tubular member surrounding said inner tubular member with an annular gap therebetween to form a first portion of said second liquid passage and a part of an inner wall of said shaft assembly surrounding said cylindrical member with an annular gap therebetween so as to form a second portion of said second liquid passage between said part of said inner wall of said shaft assembly and said cylindrical member, said first portion of said second liquid passage communicating with said second portion of said second liquid passage; and wherein radial movement of said outer tubular member of the passage means is restricted by said cylindrical member and said inner wall of said shaft assembly supporting said cylindrical member.

2. The hydroelectric power generation equipment according to claim 1, wherein said cylindrical member includes an axially extending elongated portion, an end portion having a larger diameter than said elongated portion, and a transitional portion between said elongated portion and said end portion, said end portion having a screw means at a radially outside portion of the end portion and fixed to said inner wall of said shaft assembly, said outer tubular member being slidably fitted in a radially inside portion of said end portion of said cylindrical member, and said first portion of said second liquid passage communicating said second portion of said second liquid passage through a hole formed in said transitional portion of said cylindrical member.

3. The hydroelectric power generation equipment according to claim 2, wherein said cylindrical member has an end portion slidably fitted in an annular coupling secured to an end of said shaft assembly being closest to said runner, said annular coupling having a plurality of holes allowing the pressurized liquid to pass through.

4. The hydroelectric power generation equipment comprising:

a hydraulic turbine having a runner with a plurality of blades each having an adjustable opening, and an axially extending hollow turbine shaft connected to said runner;

an electric power generator having a hollow generator shaft aligned with and connected to the turbine shaft to define a shaft assembly;

a hydraulic cylinder having a cylinder block and a piston fixed to said runner and disposed in said cylinder block to provide two cylinder chambers separated by said piston, said cylinder block being connected to said blades and movable by oil filled in each of said two cylinder chambers;

an oil feed device having two inlet ports separated from each other;

an inner tubular means, passing through said shaft assembly, for defining a first liquid passage through which one of said two inlet ports of said oil feed device communicates with one of said two cylinder chambers of said hydraulic cylinder;

outer passage means, disposes so as to surround said inner tubular means and to pass through said shaft assembly, for defining a second liquid passage through which another inlet port of said two inlet ports of said liquid feed device communications with another of said two cylinder chambers of said hydraulic cylinder, said outer passage means including an outer tubular member disposed so as to face an inner wall of said shaft assembly with a gap, said inner tubular means and said outer passage means being supported by said oil feed device and said runner; and restriction means having at least one portion disposed between both ends of said shaft assembly, for restricting radial movement of said outer tubular member, whereby said inner tubular means and said passage means are supported by at least three portions of the feed device, the runner, and the hollow turbine shaft respectively, and wherein said restriction means is disposed at a middle portion between opposite ends of said first and second liquid passages, and wherein said inner tubular means includes an inner tubular member connected to said outer tubular member by means of slide fit, thereby forming said first liquid passage therein, a cylindrical member having an elongated tubular portion, an end portion expanded radially, and a transitional portion between said elongated tubular portion, an end portion expanded radially, and a transitional portion between said elongated tubular portion and said end portion, said end portion having screw means at an outside thereof and screwed in the inner wall of said shaft assembly, and said outer tubular member being fitted in an inside of said end portion of said cylindrical member, whereby said outer tubular member is restricted to move radially.

5. The hydroelectric power generation equipment according to claim 4, wherein said transitional portion of said cylindrical member has a plurality of holes, a first portion of said second liquid passage being defined by and between said outer tubular member and said inner tubular member and a second portion of said second liquid passage being defined by and between said cylindrical member and the inner wall of said shaft assembly, and said first portion of said second liquid passage communicating with said second portion of said second liquid passage through said holes of said transitional portion.

6. The hydroelectric power generation equipment according to claim 5, wherein said runner has a cylindrical hollow projection connected to said shaft assembly and a tubular partition member inserted in said projection and dividing an inside space of said runner into a region for said first liquid passage and a region for said second liquid passage.

7. The hydroelectric power generation equipment according to claim 6, wherein an annular coupling is fixed to an end portion of said shaft assembly, said cylindrical member being fitted in said annular coupling, and said annular coupling having holes through which pressurized oil passes through and abutting an end portion of said tubular partition member, said end portion being formed in a flange shape having through holes fluidly communicating with said holes of said annular coupling.

8. The hydroelectric power generation equipment according to claim 7, wherein said piston of said hydraulic cylinder is fixed to said projection of said runner, and said cylinder block is mounted on said projection to be slidable thereon.

9. The hydroelectric power generation equipment according to claim 8, wherein an opening detection rod is provided in said first liquid passage to pass therethrough, said rod being fixed to a cover member of said cylinder block to move together with said cylinder block, whereby the opening of said blades is detected by movement of said rod.

* * * * *